United States Patent
Li et al.

(10) Patent No.: US 7,814,467 B2
(45) Date of Patent: Oct. 12, 2010

(54) PROGRAM OPTIMIZATION USING OBJECT FILE SUMMARY INFORMATION

(75) Inventors: Xinliang David Li, Sunnyvale, CA (US); Mur Litharan Vijayasundaram, Santa Clara, CA (US); Dmitry Mikulin, San Carlos, CA (US); Shin-Ming Liu, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1788 days.

(21) Appl. No.: 10/758,376

(22) Filed: Jan. 15, 2004

(65) Prior Publication Data
US 2005/0160058 A1 Jul. 21, 2005

(51) Int. Cl.
G06F 9/45 (2006.01)
G06F 9/44 (2006.01)

(52) U.S. Cl. ............... 717/151; 717/153; 717/162; 717/136; 717/146; 717/140

(58) Field of Classification Search ......... 717/136–146, 717/151–167
See application file for complete search history.

(56) References Cited

U.S. PATENT DOCUMENTS

| | | | |
|---|---|---|---|
| 5,301,317 A | | 4/1994 | Lohman et al. |
| 5,584,027 A | | 12/1996 | Smith |
| 5,812,855 A | * | 9/1998 | Hiranandani et al. ........ 717/157 |
| 5,826,087 A | * | 10/1998 | Lohmann ................... 717/146 |
| 5,835,773 A | * | 11/1998 | Dunn ........................ 717/158 |
| 5,920,723 A | * | 7/1999 | Peyton et al. ............... 717/157 |
| 5,923,882 A | * | 7/1999 | Ho et al. .................... 717/147 |
| 5,926,639 A | * | 7/1999 | Richardson ................. 717/156 |
| 6,059,839 A | * | 5/2000 | Dehnert et al. .............. 717/154 |
| 6,173,444 B1 | * | 1/2001 | Archambault ............... 717/159 |
| 6,202,205 B1 | * | 3/2001 | Saboff et al. ................ 717/151 |
| 6,219,834 B1 | * | 4/2001 | Soroker et al. .............. 717/145 |
| 6,289,505 B1 | * | 9/2001 | Goebel ...................... 717/153 |
| 6,292,940 B1 | * | 9/2001 | Sato ......................... 717/157 |
| 6,631,518 B1 | * | 10/2003 | Bortnikov et al. ........... 717/158 |
| 6,966,055 B2 | * | 11/2005 | Haber et al. ................ 717/151 |
| 7,257,806 B1 | * | 8/2007 | Chen et al. ................. 717/141 |
| 2002/0147718 A1 | * | 10/2002 | Coutant ....................... 707/8 |
| 2003/0088860 A1 | * | 5/2003 | Wang ........................ 717/153 |
| 2004/0194073 A1 | * | 9/2004 | Chan et al. ................. 717/151 |
| 2005/0097528 A1 | * | 5/2005 | Chakrabarti et al. ......... 717/140 |

OTHER PUBLICATIONS

Srivastva et al, "Link-Time Optimization of Address calculation on a 64-bit Architecture," ACM, 1994.*
Ghiya et al., "On the Importance of Points-To Analysis and Other Memory Disambiguation methods for C Programs," ACM, 2001.*

* cited by examiner

Primary Examiner—Insun Kang

(57) ABSTRACT

A method of generating a software program executable binary file. A first file including source code therein is accessed. A second file including object code therein and further including object file summary information is accessed. The executable binary file is generated from at least the first and second files. The object file summary information is used in optimizing the executable binary file generated.

33 Claims, 8 Drawing Sheets

```
int g;

void bar(int** fp1, int** fp2, int i)
{

*fp1 = &g;
   *fp2 = (int*) malloc(i*sizeof(int));
   return;
} int foo()
{
   int* fp1, *fp2, i;

bar(&fp1, &fp2, 100);
   g = 1;

fp2[0] = 10;

for  (i = 1; i< 100; i++)
   {
      fp2[i] = 2*g + 10;
   }

*fp2+= 10;         (1)

*fp1 = 20;         (2)

return g;
}
```

FIG. 4

```
int foo()
{
    int *fp1, *fp2, i;
    bar(&fp1, &fp2, 100);

fp2[0] = 10;

for (i = 1; i< 100; i++)
    {
        fp2[i] = 12;
    }
    *fp2 += 10;
    *fp1 = 20;
    return 20;
}
```

FIG. 5

```
int * gp;

int foo(int *f)
{
      int *l = 0;

l = f;    (1)    // <- this assignment need not be
represented in SIR

....

gp = l;   (2)    // <-- this assignment to be
represented as gp = f in SIR.

```
struct A {
   int i;
   int* fd;
   ...
};

extern int g[]
extern int* gp;

int foo(A* f, int f2)
{
   A* lp;

....

if (f2 > 10)
      lp = f->fd;
   else
      lp = (char*)&g + 12;

```
int* gp;

int foo(int i)
{ int* t = (int*) malloc(i);        (1)

...
    gp = t;                            (2)

bar();                             (3)
    ..
}
```

FIG. 8

PROGRAM OPTIMIZATION USING OBJECT FILE SUMMARY INFORMATION

BACKGROUND OF THE INVENTION

1. Field of the Invention

The present invention relates generally to computer software.

2. Description of the Background Art

Whole program analysis enables aggressive compiler optimizations and improvements to a software program's runtime performance. The ultimate goal of whole program analysis is to analyze source code for substantially the entire program during the compilation phase to obtain an optimized compilation. One difficulty with whole program analysis is that the compiler normally does not have access to the source code of the entire program and so does not have access to all the information it needs for optimization. Instead, the compiler typically only has access to source code provided to the compiler by the programmer (user), but not access to the source code for previously compiled object files of a library or separate load module. Without access to this information, the compiler cannot fully identify all the different relationships between the various portions of the whole program.

Obstacles to the widespread use and adoption of whole program analysis include the following. First, many software applications are developed using third party shared libraries for which source code is unavailable. Second, some software applications are developed using previously compiled modules from a third party, and source code for these modules is typically unavailable. Third, even if a software program is being developed without third party shared libraries or modules, a programmer often chooses to partition the sources and build them into shared libraries.

SUMMARY

One embodiment of the invention relates to a method of generating a software program executable binary file. A first file including source code therein is accessed. A second file including object code therein and further including object file summary information is accessed. The executable binary file is generated from at least the first and second files. The object file summary information is used in optimizing the executable binary file generated.

Another embodiment of the invention pertains to a system for generating a software program executable file. The system includes a source file for the program, an object file including object file summary information, and a translator configured to access at least the source and object files and to generate the executable file of the program therefrom. The object file summary information is used in optimizing the executable file generated.

BRIEF DESCRIPTION OF THE DRAWINGS

FIGS. 4 through 8 provide source code routines used as examples in the detailed description.

DETAILED DESCRIPTION

Figure 1:
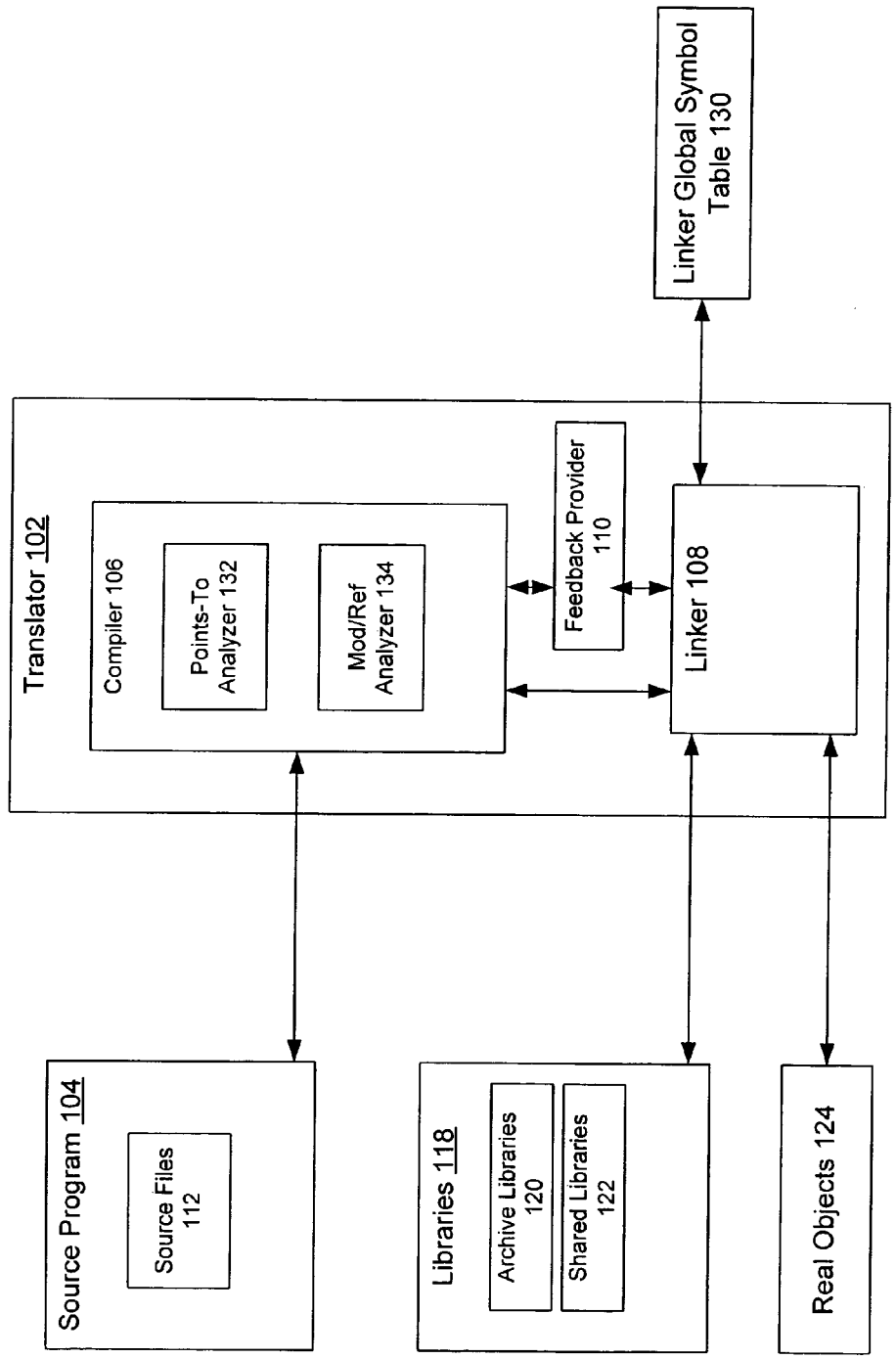
FIG. 1 is a schematic diagram depicting a system for generating a software program executable file in accordance with an embodiment of the invention.

FIG. 1 is a schematic diagram depicting a system 100 for generating a software program executable file in accordance with an embodiment of the invention. The system 100 includes a translator 102 that is used to translate and optimize a source program 104 into executable binary code. The translator 102 includes a compiler 106, a linker 108, and a feedback provider 110.

The compiler 106 is configured to translate source files 112 of the source program 104 into intermediate objects and object files. The linker 108 is configured to link the various object files, including those compiled by the compiler, into the executable program. The linker 108 may also access and use code and other information in various files, for example, program libraries 118 and real objects 124. The program libraries 118 may include archive libraries 120 and shared libraries 122.

As depicted in FIG. 1, the compiler 106 may include various modules. In accordance with an embodiment of the invention, the compiler 106 includes a points-to analyzer 132. In accordance with another embodiment of the invention, the compiler 106 includes a modification/reference analyzer 134. The operation of these modules is described further below. As further shown in FIG. 1, the system 100 also includes a linker global symbol table 130. This table is created and maintained by the linker 108 and, as described further below, may be used to provide various information pertinent to program optimization.

The feedback provider 110 provides a feedback communications channel between the linker 108 and the compiler 106. In an embodiment, the feedback provider 110 comprises a dynamically loadable library (DLL) that contains the various application programming interfaces (APIs) used by the compiler 106 to access the linker 108 and by the linker 108 to access the compiler 106.

Figure 2:
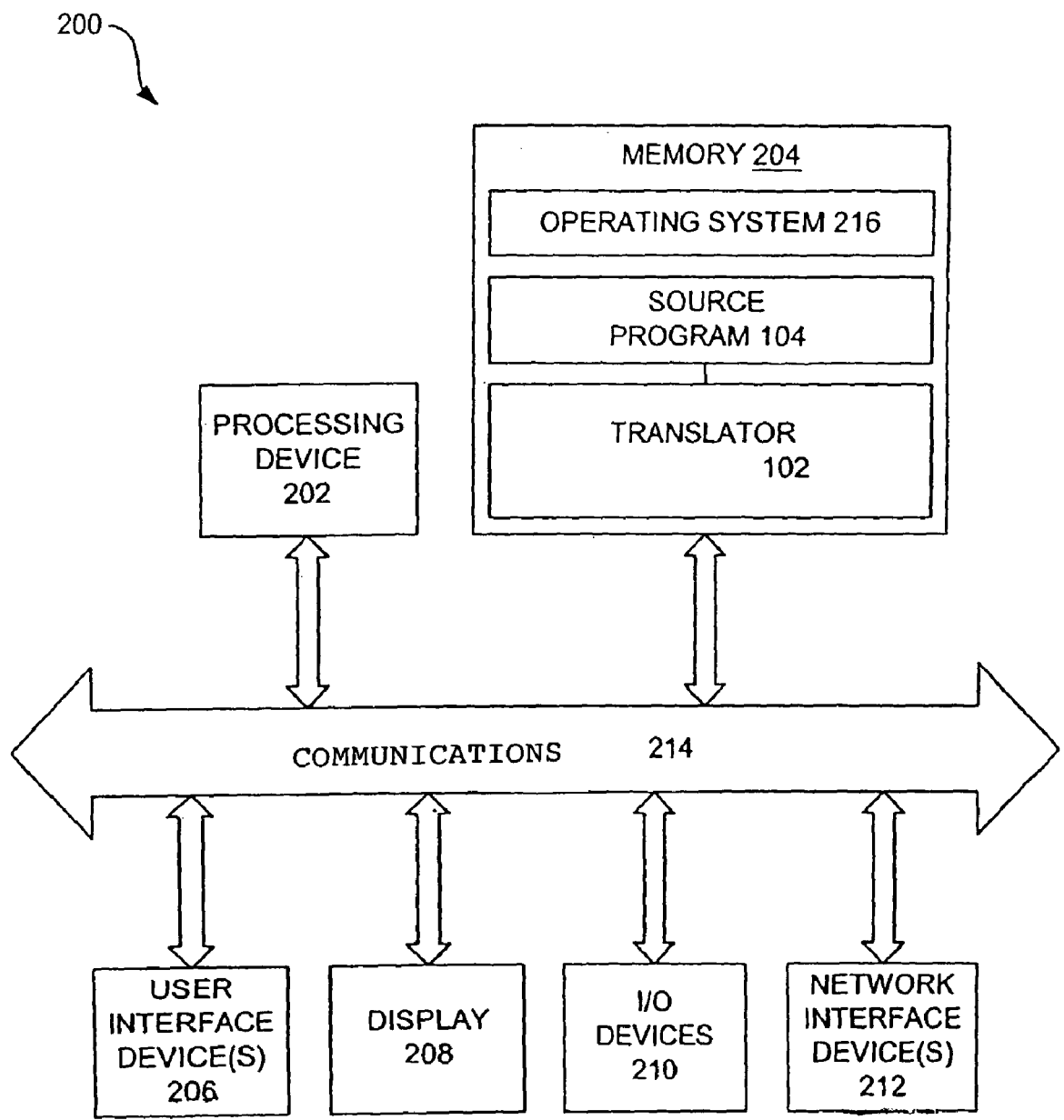
FIG. 2 is a schematic diagram depicting an exemplary computing system on which the translator shown in FIG. 1 may be executed.

FIG. 2 is a schematic diagram depicting an exemplary computing system 200 on which the translator 102 shown in FIG. 1 may be executed. For example, the computing system 200 may comprise a workstation, desktop computer, portable computer, dedicated server computer, multiprocessor computing device, or other type of computing system. The computing system 200 may include a processing device 202, a memory system 204, and various other components. The memory system 204 is an example of a computer-readable storage medium. The processing device 202 typically comprises one or more microprocessors. The memory system 204 may comprise various forms of memory and may hold an operating system 216, as well as the translator 102 and the source program 104 to be translated. These various other components may include, for example, user interface device(s) 206, a display device 208, other input/output devices 210, network interface device(s) 212, and other components. A communications system 214 (for example, comprising one or more communications buses) is used to interface between the various components. While FIG. 2 shows typical components and a generalized configuration for such a computing system 200, the details for such a system will vary according to the implementation.

Figure 3:
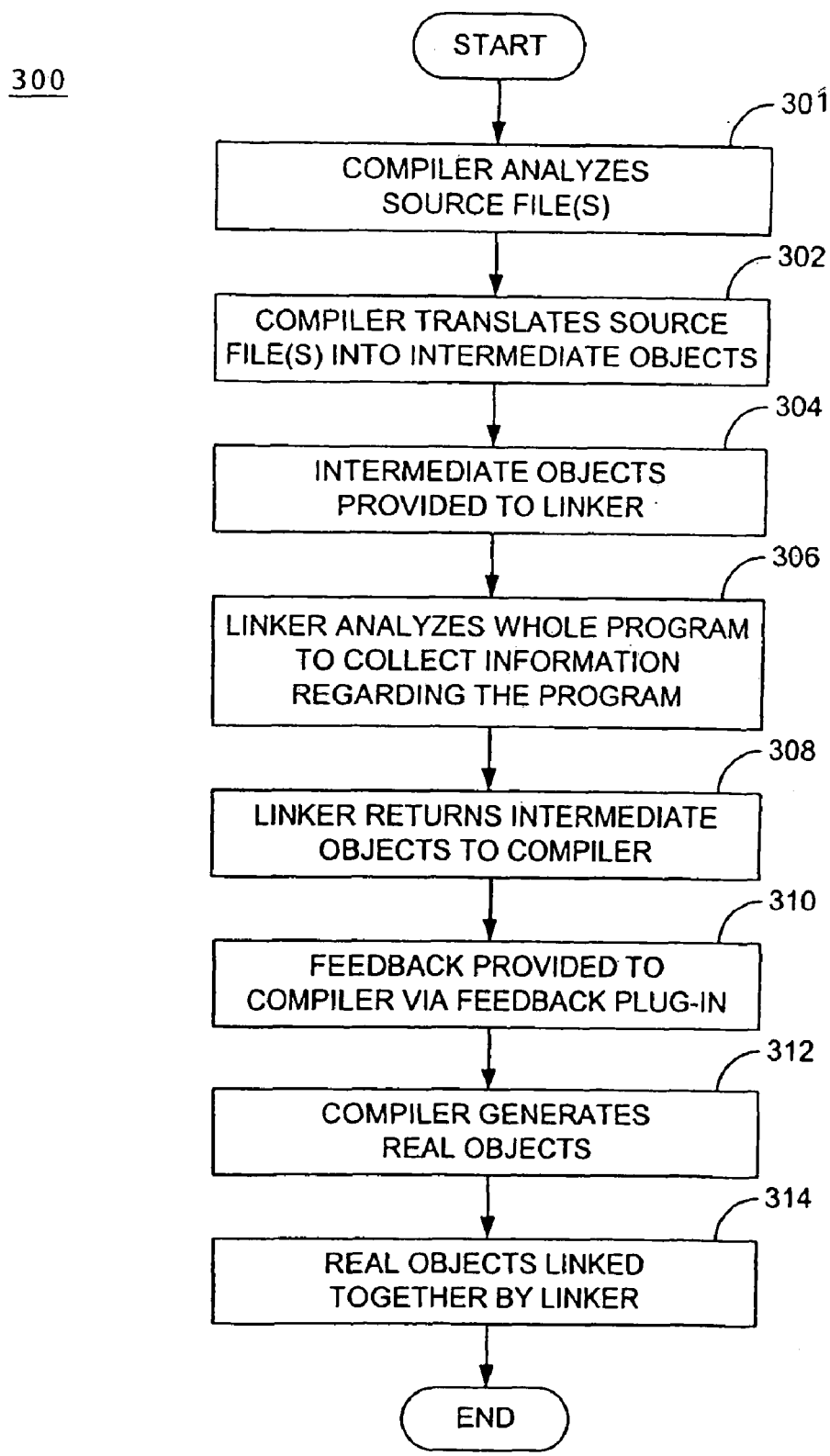
FIG. 3 is a flow chart depicting a method of generating a software program executable binary file in accordance with an embodiment of the invention.

FIG. 3 is a flow chart depicting a method 300 of generating a software program executable binary file in accordance with an embodiment of the invention. The method 300 involves various steps, as discussed below. Variations of this method 300 may also be implemented in accordance with other embodiments of the invention.

The compiler 106 accesses and analyzes, in block 301, the source files 112 that have been provided to the compiler 106 for compilation. Through the analysis, the compiler 106 processes and translates, in block 302, the source files 112 into intermediate objects.

The intermediate objects are provided, in block 304, to the linker 108. The linker analyzes, in block 306, the "whole" program, including accessing various components, such as the intermediate objects, libraries 118, and real objects 124, to collect information about the program that will be provided to the compiler 106 so that the program may be optimized in some manner during the final compilation process.

The linker 108 returns, in block 308, the intermediate objects to the compiler 106, and feedback is provided, in block 310, to the compiler 106 via the feedback provider 110. The feedback includes information determined by the linker 108 during the aforementioned analysis in block 306. Once this feedback has been provided to the compiler 106, the compiler 106 completes the translation of the intermediate objects to generate, in block 312, real objects. The real objects are subsequently linked together, in block 314, by the linker 108 to produce an executable binary program.

In accordance with an embodiment of the present invention, the optimization of the executable program is improved by way of utilizing object file summary information. Object files, such as the real objects 124 and the object files from the libraries 118, are configured to include this object file summary information, in addition to the object code therein. The object file summary information is described in further detail below.

In accordance with an embodiment of the present invention, the points-to analyzer 132 of the compiler 106 uses the object file summary information during the whole program type analysis in block 306. As discussed further below, the object file summary information is used by the points-to analyzer 132 in order to disambiguate memory accesses otherwise considered aliased.

In accordance with another embodiment of the present invention, the object file summary information is used by the modification/reference (mod/ref) analyzer 134 of the compiler 106 during the whole program type analysis in block 306. As discussed further below, the object file summary information is used by the mod/ref analyzer 134 to determine variables modified by and referenced by function calls.

Before proceeding, a few terms are now discussed. A module is a unit of compilation. A module physically corresponds to a file containing a collection of function and data definitions. A module may be in three different forms. First, a module may be in source file form, i.e. in the form of source languages. Second, a module may be in intermediate form. The intermediate form represents the module in a form that is suitable for program analysis and optimization. Third, a module may be in object file form. The object file contains machine code that may be executed. A shared library is a collection of functions and/or procedures that can be shared by multiple executables. A linker may create a shared library using one or more object files. A shared library is sometimes called a load module. An application program may depend on one or more shared libraries to run.

As described above in the background, there are difficulties in using whole program analysis to effectively optimize a program being compiled when the program utilizes object files, archive libraries, and/or shared libraries. An embodiment of the present invention provides a method and system to improve optimization achievable by whole program analysis.

The following describes in further detail a method and system that allow a translator to perform points-to analysis and mod/ref analysis in the presence of object files, archive libraries, and shared libraries. Points-to analysis and mod/ref analysis are two types of whole program analysis. Points-to analysis improves optimization by disambiguating memory accesses otherwise considered aliased. Mod/ref analysis improves optimization by determining which variables are modified by and referenced by function calls in the object code.

The general problem posed is now described using an example. Suppose there are five modules. Three of these modules are in source form (or in an intermediate form), while the other two are in object form. For example, the modules in source form may be named "1.c", "2.c", and "3.c" (where ".c" indicates a source file), and those in object form may be named "4.o" and "5.o" (where ".o" indicates an object file).

The executable file for the program may be built using different build scenarios. For example, in a first build scenario, 1.c, 2.c, and 3.c are compiled, then they are linked with 4.o and 5.o. In a second build scenario, 4.o and 5.o are linked into a shared library (for example, "libt.so"), then 1.c, 2.c, and 3.c are compiled and linked with the shared library. In either of the above scenarios, it is desirable to perform whole program analysis when compiling 1.c, 2.c, and 3.c, but the program information for modules 4 and 5 are not available because they have been precompiled to object form.

One aspect of the present invention relates to solving the above-discussed problem. In accordance with an embodiment of the invention, information needed to perform certain types of whole program analysis are determined and saved into the object files. This information may be thought of as being equivalent to having the whole source for those modules available with respect to those types of analysis. We call this information "object file summary information" (OFSI) to distinguish this type of summary data from the summary data stored in intermediate representation (IR) files which are used for the purpose of speeding up the compile time.

OFSI may be included in both standalone object files, and those that are linked into libraries. When objects are linked into shared libraries, the OFSI for the contributing object files may be merged. Later, when performing the applicable whole program analysis, the compiler may ask the linker to feed back the OFSI stored in the standalone object file or shared library through a callback mechanism.

OFSI and Points-to Analysis

In accordance with an embodiment of the invention, the object file summary information (OFSI) is used in performing a "points-to" analysis so as to disambiguate memory accesses otherwise considered aliased. Points-to analysis determines the points-to relations of memory locations or memory alias information. The results of the points-to analysis may be used by a compiler to disambiguate memory accesses that are otherwise considered aliased. The improved alias information provided by points-to analysis advantageously benefits optimization of the compiled code, including scheduling performed by the compiler backend.

FIG. 4 show source code for two example routines named "bar" and "foo". These two routines are used to give a concrete example for our discussion of the points-to analysis aspect of the present invention.

Conventionally, the function "bar" would be defined in a module in object form without OFSI. Without the OFSI, the compiler cannot determine, after the call to bar in "foo", whether or not indirect memory accesses by way of "fp1" and "fp2" alias with "g". The compiler will instead work on the assumption that fp1 and fp2 may point to anything, including g.

In accordance with an embodiment of the invention, OFSI for points-to analysis is included in the object file for bar. Using the OFSI, the compiler is able to apply points-to analysis to determine that the indirect accesses via fp2 do not alias with g, but that the indirect accesses via fp1 must alias with g. With this alias information determined, the constant definition of "g=1" may be advantageously propagated by the compiler to the use of g in the loop within foo. The compiler may also advantageously determine that the assignment "g=1" is no longer needed after the propagation, and so the use of "g" in the return statement may be replaced simply with "20". In addition, the compiler is also then free to reorder the instructions labeled (1) and (2) in FIG. 4. Hence, after the optimization, "foo" may be, for example, effectively changed to be as shown in FIG. 5.

An embodiment of the OFSI for points-to analysis is now described. This embodiment implements the OFSI in a generic-like form so that it is substantially independent of the specific points-to algorithm used and independent of the specific compiler that consumes the information. In accordance with this embodiment, the OFSI includes an extension to the linker symbol table, summary intermediate representations (SIRs) that are stored in the object files (and shared libraries), and control data structures in the object files (and shared libraries). The SIRs may also be referred to as per-procedure summary data.

The linker symbol table exists for relocatable objects and shared libraries (if not stripped). There is one linker symbol table per module or per shared library. The table defines the global context for the summary data. Each linker symbol table entry has a unique index, here referred to as a linker identifier (LI_ID).

In accordance with this embodiment, the extension to the linker symbol table comprises a boolean flag "doesNotExposeAddress" added for each procedure identified therein. If the procedure does not expose addresses of any memory location, this flag is set to true for that procedure. A procedure does not expose addresses of any memory location when it does not save the address into any memory location accessible outside of the procedure. For all such procedures with the flag set to true, no additional OFSI is needed for the purpose of points-to analysis.

In accordance with this embodiment, the SIR includes the bulk of the OFSI and is organized per procedure for procedures defined in the library or object file. The SIR includes a summary symbol table per procedure and a list including exposed pointer assignments (SIR assignments).

The exposed pointer assignments comprise the pointer assignments that may affect the pointer values visible to the caller of the procedure. Assignments to non-exposed local variable of the procedure can be safe to ignore after propagating the variable's value to all uses of the variable. For example, consider the example source code shown in FIG. 6. The assignment labeled (1) is non-exposed and so need not be represented in the SIR. However, the assignment labeled (2) is exposed and so is to be represented in the SIR (as gp=f).

As a further detail, consider local variables whose addresses are exposed to other global variables (either directly or indirectly). These exposed local variables may also be safely ignored (i.e. not represented in the SIR) if all callees called by the current procedure are also defined in the same library.

Each symbol in the summary symbol table has an associated identifier herein referred to as the SYMID. The SYMID is referenced by SIR assignments (SIR operators). Note that the use of SYMID in the assignments does not require linker fixup when object files are linked into shared libraries.

In accordance with an embodiment, the summary symbol table of the SIR includes data relating to the following: a) global and static symbols accessed in the procedure; b) formal parameters (formal symbols) of the procedure; c) the function return location for the procedure; and d) other procedures called by this procedure. The global/static symbol entry includes the LI_ID of the entry in the above-discussed linker symbol table. The data relating to the formal parameters includes the positions of the formal parameters. An object relocation type is used that is system specific.

For example, the SIR assignments may be of the following format: <LHS_EXP, RHS_EXP, <offset>>, where LHS_EXP refers to the left hand side of the expression and RHS_EXP refers to the right hand side of the expression. The offset is optional and may default to zero when omitted. Various operators may be defined and used in the SIR assignments. In accordance with an embodiment of the invention, these operators include deref, off_adjust, address_of, merge, join, call, icall, and no_op operators.

The deref operator comprises an operator for memory referencing. In this implementation, the kind of access (read or write) may be implied by the context of the operator and need not be represented explicitly. The deref operator may take the form of deref (SYMID|address_expression, <offset>). In this form, the deref operator takes an expression or SYMID as the first operand and an optional offset field. When the offset is omitted, it is assumed to be zero.

The following are example expressions using the deref operator. First, consider a direct access to variable "x". This may be represented by deref (x). Second, consider a direct access of field "fd" (at offset 4) of variable "y". This may be represented by deref (y,4). Third, consider an indirect access via the pointer *x. This may be represented by deref (deref (x)). Fourth, consider an indirect access of a field fd (at offset 4) of a location pointed to by pointer z. This may be represented by deref (deref(z), 4). Alternatively, using the off_adjust operator discussed below, this may be represented by deref (off_adjust (deref(z), 4)).

The off_adjust operator may be used to adjust the address expression by a certain (non-zero) amount of offset in bytes. The off_adjust operator may take a form that uses two operands, wherein a first operand comprises the expression, and a second operand comprises the offset value. The offset may be unknown.

The following discusses an example of a SIR assignment using the deref and off_adjust operators. Consider the expression x=(char*) &z->fd+12. The corresponding SIR assignment to represent that expression may comprise <deref(x), off_adjust(deref(z), 16)> wherein 16 is the folded value of 4 (the offset of field "fd") plus 12. The above expression may be equivalently represented as <deref(x), deref(z), 16> which is a more efficient form.

The address_of operator comprises the operator that is used to take the address of a variable or function. For example, the expression z=&y may be represented by the SIR assignment <deref(z), address_of(y)>. As another example, the expression x=&y.fd may be represented by the assignment <deref(x), off_adjust (address_of(y), 4). Note that deref (address_of (x)) is equivalent to deref (x).

The merge operator comprises the operator used to merge pointer values from different control flow paths. The merge operator is used for copy propagating local variable values to global variables. Consider the example source code included in FIG. 7. After copy propagation, the expression labeled (1) in FIG. 7 may be represented by the following SIR assignment:

<deref(gp), merge(deref(deref(f),4), off_adjust (address_of(g), 12))>

The join operator relates to pointer assignments. Pointer assignments in the right hand side of expressions in source code are usually in the form of base_address+offset. However, in many cases, the compiler cannot determine which component value is the base address and which one is the offset. This difficulty is often due to use of pointer values as integer types. In such a case, the compiler generally makes the conservative assumptions that each component value may potentially be the base address, and that the offset is compile time unknown.

For example, consider the expression x=a+b+c, where all of the variables are integers. It is possible that "a" is the base address, and that b+c is the offset. It is also possible that "b" is the base address, or that "c" is the base address. Hence, one way to represent this is to split the SIR assignment into the following three assignments to represent the potential pointer effects.

$x=a$+unknown_offset $y=a$+unknown_offset $z=a$+unknown_offset

However, the above representation requires more space and is inefficient. To facilitate the assignment in such situations, the join operator may be utilized. Using the join operator, the expression x=a+b+c may be represented using the following assignment.

<deref($x$), join(deref($a$), deref($b$), deref($c$))>

Note that the join operator implies off_adjust ( . . . , unknown_offset), so join ( . . . ) is equivalent to off_adjust (join( . . . ), unknown_offset).

The call operator comprises the operator used to represent direct procedure calls. The call operator takes an arbitrary number of operands. The first operand is the SIR SYMID of the target function. The rest of the operands are argument expressions.

The icall operator comprises the operator used to represent indirect procedure calls. The icall operator also takes an arbitrary number of operands. The first operand is the expression that produces the function pointer. The rest of the operands are argument expressions.

The no_op operator comprises the "no operation" operator that may be used to discard values. For example, if a call does not have a return value, or if the return value is not used, the no_op operator may be used in the LHS_EXP. The no_op operator does not have any operand. Consider the example source code in FIG. 5. The expressions labeled (1), (2), and (3) are representable with the following assignments:

<deref(gp), call(malloc), deref($i$)>

<no_op( ), call(bar)>

Now we discuss the control data structures. A control data structure is included in the summary data in the object files and shared libraries. The compiler uses the control data structure to iterate through all of the procedures therein. In one embodiment, the control data structure is implemented by having a link field in the SIR data block for each procedure. This link field points-to the SIR block of the next procedure. In another embodiment, the control data structure is implemented by having a separate table containing links to the SIR block of each procedure. With either implementation, when object files are linked into shared libraries, the linker adjusts the link fields accordingly.

Mod-Ref Analysis

In accordance with another embodiment of the invention, the object file summary information (OFSI) is used in performing a "modification/reference" (mod-ref) analysis. The mod-ref analysis determines variables modified by and referenced by function calls. The results of the mod-ref analysis may be used advantageously by the compiler to improve optimization of the compiled code.

The objective of mod-ref analysis comprises finding out the call-side effects of the function call. In other words, mod-ref analysis determines which variables are modified by the call, and which variables are referenced by the call, if any. In order to compute the mod-ref sets for a procedure, the compiler determines the following: a) global and static ("non-local") symbols that are directly modified or referenced ("mod-ref'd") in the procedure; b) the mod-ref sets of calls invoked in this procedure; and c) the points-to analysis results (discussed above).

Most of the information needed to perform the mod-ref analysis is already in the OFSI for the points-to analysis (discussed above). The following additions to the OFSI are used to perform the mod-ref analysis.

a) Additional summary bits (flags) are to be added as a further extension to the linker symbol table. In one embodiment, these bits may comprise the following flags. A first flag indicates that the procedure does not modify global or static variables. A second flag indicates that the procedure does not reference global or static variables. A third flag indicates that the procedure does not modify global or static variables directly (excluding callees). A fourth flag indicates that the procedure does not reference global or static variables directly (excluding callees).

b) Additional per-procedure summary data is also included. The additional summary data may be represented as a linked list of entries. Each entry corresponds to a symbol directly modified or referenced in the procedure. The entry includes the following information. First, the LI_ID of the symbol. Second, flags indicating whether the symbol was modified or referenced.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of generating a software program executable binary file, the method comprising:
    accessing, by a processing device, a first file for a first module, wherein the first file includes source code;
    accessing, by the processing device, a second file for a second module, wherein the second file includes machine-executable object code and object file summary information; and
    generating, by the processing device, the executable binary file from at least the first and second files, wherein the object file summary information is used in optimizing the executable binary file generated,
    wherein the object file summary information includes a summary intermediate representation (SIR) and an extension to a linker symbol table, wherein the SIR includes information relating to symbols accessed by a procedure in the object code, and wherein the extension to the linker symbol table includes a flag indicating whether the procedure exposes a memory address by storing the memory address in a location accessible outside the procedure.

2. The method of claim 1, further comprising disambiguating memory accesses otherwise considered aliased using the object file summary information.

3. The method of claim 1, wherein the SIR includes a summary symbol table.

4. The method of claim 3, wherein the summary symbol table includes global and static symbols accessed in the procedure, formal parameters of the procedure, a return location for the procedure, and other procedures called by the procedure.

5. The method of claim 4, wherein a symbol is referenced in the summary symbol table by using an associated summary symbol identifier (SYMID).

6. The method of claim 3, wherein the SIR uses an operator for memory referencing.

7. The method of claim 3, wherein the SIR uses an operator to adjust an address expression by an offset.

8. The method of claim 3, wherein the SIR uses an operator to take an address of a function or variable.

9. The method of claim 3, wherein the SIR uses an operator to merge pointer values from different control flow paths.

10. The method of claim 3, wherein the SIR uses an operator to represent direct procedure calls.

11. The method of claim 3, wherein the SIR uses an operator to represent indirect procedure calls.

12. The method of claim 3, wherein the SIR uses a no-operation type operator to discard values.

13. The method of claim 3, wherein the SIR includes a control data structure comprising a link field for each procedure that points to an SIR block of a next procedure.

14. The method of claim 3, wherein the SIR includes a control data structure comprising a table having links to an SIR block for each procedure.

15. The method of claim 1, further comprising determining variables modified by and referenced by function calls in the object code using the object file summary information.

16. The method of claim 15, wherein the extension to the linker symbol table further includes a second flag indicative of whether the procedure modifies non-local variables and a third flag indicative of whether the procedure references non-local variables.

17. The method of claim 16, wherein the second flag is indicative of whether the procedure modifies global/static variables.

18. The method of claim 15, wherein the SIR comprises a linked list of entries corresponding to symbols directly modified or referenced in a procedure.

19. The method of claim 18, wherein each entry comprises a linker identifier of a corresponding symbol and flags indicative of whether that symbol is modified or referenced.

20. The method of claim 1, wherein the second file comprises a load module that is a shared library of procedures.

21. The method of claim 1, wherein multiple files including object code are accessed and used in generating the software program executable binary file.

22. The method of claim 1, wherein the SIR further includes exposed pointer assignments, wherein each of the exposed pointer assignments is an assignment of a pointer that is visible to a caller of the procedure.

23. A system for generating a software program executable file, the system comprising:
    a processing device configured to execute computer-readable program code;
    a memory system configured to store the computer-readable program code and data;
    a source file for a first module comprising source code stored by the memory system;
    an object file for a second module including machine-executable object code and object file summary information; and
    a translator comprising computer-readable program code stored by the memory system, wherein the computer-readable program code of the translator is configured to access at least the source and object files and to generate the software program executable file therefrom while using the object file summary information to optimize the generated software program executable file,
    wherein the object file summary information includes a summary intermediate representation (SIR) and an extension to a linker symbol table, wherein the SIR includes information relating to symbols accessed by a procedure in the object code, and wherein the extension to the linker symbol table includes a flag indicating whether the procedure exposes a memory address by storing the memory address in a location accessible outside the procedure.

24. The system of claim 23, further comprising a points-to analyzer configured to use the object file summary information to disambiguate memory accesses otherwise considered aliased.

25. The system of claim 23, further comprising a module configured to use the object file summary information to determine variables modified by and referenced by function calls in the object file.

26. The system of claim 23, wherein the translator comprises:
    a compiler configured to translate the source file into an intermediate file; and
    a linker configured to access the object file summary information and communicate information to the compiler relevant to optimizing compilation of the software program.

27. The system of claim 26, wherein the translator further comprises a feedback provider that provides a communications interface between the compiler and the linker.

28. The system of claim 23, wherein the SIR further includes exposed pointer assignments, wherein each of the exposed pointer assignments is an assignment of a pointer that is visible to a caller of the procedure.

29. A computer-readable storage medium storing code that upon execution by a processing device causes the processing device to:
- access a first file for a first module, wherein the first file includes source code;
- access a second file for a second module, wherein the second file includes machine-executable object code and object file summary information; and
- generate an executable binary file from at least the first and second files, wherein the object file summary information is used in optimizing the executable binary file generated,
- wherein the object file summary information includes a summary intermediate representation (SIR) and an extension to a linker symbol table, wherein the SIR includes information relating to symbols accessed by a procedure in the object code, and wherein the extension to the linker symbol table includes a flag indicating whether the procedure exposes a memory address by storing the memory address in a location accessible outside the procedure.

30. The computer-readable storage medium of claim 29, wherein the SIR includes a summary symbol table.

31. The computer-readable storage medium of claim 30, wherein the summary symbol table includes global and static symbols accessed in the procedure, formal parameters of the procedure, a return location for the procedure, and other procedures called by the procedure.

32. The computer-readable storage medium of claim 29, wherein the SIR uses a plurality of operators from a group of operators including an operator for memory referencing, an operator to adjust the address expression by an offset, an operator to take an address of a function or variable, an operator to merge pointer values from different control flow paths, an operator to represent direct procedure calls, an operator to represent indirect procedure calls, and a no-operation type operator to discard values.

33. The computer readable storage medium of claim 29, wherein the SIR further includes exposed pointer assignments, wherein each of the exposed pointer assignments is an assignment of a pointer that is visible to a caller of the procedure.

* * * * *